(12) United States Patent
Gao et al.

(10) Patent No.: US 12,480,861 B2
(45) Date of Patent: Nov. 25, 2025

(54) METHOD AND APPARATUS FOR DETERMINING ROAD SURFACE ADHESION COEFFICIENT, AND AUTONOMOUS DRIVING VEHICLE

(71) Applicant: Apollo Intelligent Driving Technology (Beijing) Co., Ltd., Beijing (CN)

(72) Inventors: Yuelei Gao, Beijing (CN); Yun Zhao, Beijing (CN); Zhihua Yu, Beijing (CN); Yanfu Zhang, Beijing (CN); Zhenmin Zhu, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 324 days.

(21) Appl. No.: 18/113,343

(22) Filed: Feb. 23, 2023

(65) Prior Publication Data
US 2023/0204491 A1    Jun. 29, 2023

(30) Foreign Application Priority Data
Feb. 23, 2022 (CN) .......................... 202210167695.7

(51) Int. Cl.
*G01N 19/02*    (2006.01)

(52) U.S. Cl.
CPC ................... *G01N 19/02* (2013.01)

(58) Field of Classification Search
CPC .. G01M 17/02; G01M 17/022; G01M 17/027; G01M 17/021; G01M 17/024; G01M 17/025; G01M 17/013; G01M 17/007; G01M 1/045; G01M 17/06; G01M 1/326; G01M 1/02; G01M 1/30; G01M 17/0074; G01M 5/0058; G01M 1/26; G01M 17/04; G01M 1/225; G01M 17/065; G01M 17/0072; G01M 17/10; G01M 7/00;
(Continued)

(56) References Cited

U.S. PATENT DOCUMENTS

| 6,597,980 B2 * | 7/2003 | Kogure ................. B60W 40/10 701/80 |
| 6,650,987 B2 * | 11/2003 | Kogure .................. B60T 8/172 701/80 |

(Continued)

FOREIGN PATENT DOCUMENTS

| CN | 104325980 A | 2/2015 |
| CN | 105691403 A | 6/2016 |

(Continued)

*Primary Examiner* — Andre J Allen
(74) *Attorney, Agent, or Firm* — Kilpatrick Townsend & Stockton LLP

(57) ABSTRACT

A method and an apparatus for determining a road surface adhesion coefficient are provided. The method includes: determining, based on M state parameters of a vehicle on a target road section, M road surface adhesion coefficient estimation results respectively corresponding to the M state parameters, M being an integer greater than 1; selecting N road surface adhesion coefficient estimation results from the M road surface adhesion coefficient estimation results according to a traveling work condition of the vehicle on the target road section, N being a positive integer smaller than or equal to M; and determining a road surface adhesion coefficient of the target road section based on the N road surface adhesion coefficient estimation results.

13 Claims, 5 Drawing Sheets

(58) Field of Classification Search
CPC .......... G01M 1/16; G01M 99/00; G01M 7/08;
G01M 1/34; G01M 17/028; G01M
17/045; G01M 3/3218; G01M 3/40;
G01M 1/04; G01M 17/08; G01M 17/03;
G01M 5/0091; G01M 1/365; G01M
13/04; G01M 5/0066; G01M 1/08; G01M
1/22; G01M 13/027; G01M 5/0033;
G01M 1/00; G01M 15/044; G01M 17/00;
G01M 3/24; G01M 3/2876; G01M
5/0075; G01M 1/06; G01M 1/12; G01M
1/122; G01M 1/24; G01M 1/32; G01M
1/36; G01M 11/081; G01M 13/023;
G01M 13/025; G01M 17/0076; G01M
3/022; G01M 3/042; G01M 3/045; G01M
3/147; G01M 3/227; G01M 3/3236;
G01M 5/0016; G01M 5/0025; G01M
5/0083; G01M 7/022; G01M 7/025;
G01M 7/04; G01M 7/06; G01M 9/02;
G01M 9/04; G01M 99/002; G01M
99/004; G01M 1/14; G01M 1/28; G01M
3/002; G01M 3/04; G01M 7/02; G01M
9/06; G01N 19/02; G01N 3/56; G01N
33/42; G01N 2223/627; G01N 23/185;
G01N 29/27; G01N 33/0085; G01N
2291/2696; G01N 27/205; G01N
2291/048; G01N 2291/2692; G01N
23/083; G01N 29/11; G01N 3/32; G01N
27/24; G01N 33/445; G01N 2291/2623;
G01N 29/045; G01N 29/265; G01N
29/449; G01N 3/34; G01N 9/00; G01N
19/04; G01N 21/9515; G01N 22/00;
G01N 2203/0021; G01N 2203/0246;
G01N 27/82; G01N 29/343; G01N
2203/0222; G01N 2291/02827; G01N
27/041; G01N 29/12; G01N 29/2493;
G01N 29/42; G01N 29/4436; G01N
29/46; G01N 3/00; G01N 3/565; G01N
19/08; G01N 2203/0085; G01N
2203/021; G01N 2203/04; G01N
2203/0676; G01N 2291/0258; G01N
27/60; G01N 29/04; G01N 21/88; G01N
21/8806; G01N 21/954; G01N
2203/0274; G01N 2203/0647; G01N
2291/02872; G01N 2291/0423; G01N
2291/106; G01N 2291/2636; G01N
23/00; G01N 29/043; G01N 29/14; G01N
29/22; G01N 29/227; G01N 29/2462;
G01N 29/2475; G01N 29/2481; G01N
29/341; G01N 29/4427; G01N 3/068;
G01N 3/30; G01N 17/00; G01N
2021/9542; G01N 21/8851; G01N
2203/0092; G01N 2203/0094; G01N
2203/0464; G01N 2291/02854; G01N
27/22; G01N 27/72; G01N 27/9013;
G01N 3/08; G01N 3/12; G01N 3/48;
G01N 3/62; G01N 9/24; G01N 11/10;
G01N 15/0272; G01N 15/08; G01N
21/8901; G01N 21/952; G01N 22/02;
G01N 2203/0007; G01N 2203/0023;
G01N 2203/0039; G01N 2203/0048;
G01N 2203/0069; G01N 2203/0071;
G01N 2203/0073; G01N 2203/0096;
G01N 2203/0208; G01N 2203/0218;
G01N 2203/0244; G01N 2203/0284;
G01N 2203/0298; G01N 2203/0623;
G01N 2291/015; G01N 2291/017; G01N
2291/018; G01N 2291/0234; G01N
2291/0256; G01N 2291/02836; G01N
2291/0422; G01N 2291/0425; G01N
2291/0427; G01N 2291/045; G01N
2291/101; G01N 23/16; G01N 23/18;
G01N 23/203; G01N 25/00; G01N 25/72;
G01N 27/04; G01N 27/122; G01N
27/221; G01N 27/904; G01N 29/022;
G01N 29/036; G01N 29/223; G01N
29/2468; G01N 29/30; G01N 29/36;
G01N 29/40; G01N 29/4472; G01N
29/48; G01N 3/02; G01N 3/066; G01N
3/20; G01N 3/24; G01N 3/36; G01N
3/40; G01N 3/42; G01N 3/50; G01N
33/00; G01N 33/0073; G01N 33/24;
G01N 33/26; G01N 33/28; G01N 33/38;
G01N 33/54373; G01N 2021/8887; G01N
2203/0035; G01N 2203/005; G01N
2203/0682; G01N 2203/0688; G01N
23/043; G01N 27/02; G01N 27/83; G01N
29/0645; G01N 29/225; G01N 29/348;
G01N 3/307
USPC ................................................ 73/146–146.8
See application file for complete search history.

(56) References Cited

U.S. PATENT DOCUMENTS 8,639,412 B2 * 1/2014 Shiozawa ........... B60W 40/068
701/33.1
2020/0023852 A1 1/2020 Yi et al.

FOREIGN PATENT DOCUMENTS

| CN | 108622101 A |   | 10/2018 |
|----|-------------|---|---------|
| CN | 111845709 A |   | 10/2020 |
| CN | 112660134 A |   | 4/2021  |
| CN | 117163036 A | * | 12/2023 |
| CN | 117272525 A | * | 12/2023 |
| CN | 118850078 A | * | 10/2024 |
| CN | 119305567 A | * | 1/2025  |
| CN | 119329548 A | * | 1/2025  |

* cited by examiner

METHOD AND APPARATUS FOR DETERMINING ROAD SURFACE ADHESION COEFFICIENT, AND AUTONOMOUS DRIVING VEHICLE

CROSS-REFERENCE TO RELATED APPLICATIONS

The present application claims the priority of Chinese Patent Application No. 202210167695.7, titled "METHOD AND APPARATUS FOR DETERMINING ROAD SURFACE ADHESION COEFFICIENT, AND AUTONOMOUS DRIVING VEHICLE", filed on Feb. 23, 2022, the content of which is incorporated herein by reference in its entirety.

FIELD

The present disclosure relates to the field of artificial intelligence technology, and particularly to the fields of intelligent transportation and autonomous driving.

BACKGROUND

With the development of the automobile industry, an automobile ownership continues to increase, and traffic accidents also increase. Road conditions are an important factor affecting traffic safety. A road surface adhesion coefficient is used to evaluate the wet and slippery conditions of a road surface, and thus can be used to give an early warning for a road safety.

SUMMARY

The present disclosure provides a method and apparatus for determining a road surface adhesion coefficient, and an autonomous driving vehicle.

According to an aspect of the disclosure, a method for determining a road surface adhesion coefficient is provided, which includes:

determining, based on M state parameters of a vehicle on a target road section, M road surface adhesion coefficient estimation results respectively corresponding to the M state parameters, M being an integer greater than 1;

selecting N road surface adhesion coefficient estimation results from the M road surface adhesion coefficient estimation results according to a traveling work condition of the vehicle on the target road section, N being a positive integer smaller than or equal to M; and determining a road surface adhesion coefficient of the target road section based on the N road surface adhesion coefficient estimation results.

According to another aspect of the disclosure, an apparatus for determining a road surface adhesion coefficient is provided, which includes:

at least one processor; and a storage device, in communication with the at least one processor, wherein the storage device stores instructions executable by the at least one processor, and the instructions are executed by the at least one processor, to enable the at least one processor to perform the method for determining a road surface adhesion coefficient according to any one of embodiments of the disclosure.

According to another aspect of the disclosure, a non-transitory computer readable storage medium is provided, where the computer instruction is used to cause a computer to perform the method for determining a road surface adhesion coefficient according to any one of embodiments of the disclosure.

According to another aspect of the present disclosure, there is provided an automatic driving vehicle including an electronic device according to an embodiment of the present disclosure.

It should be understood that the content described in this part is not intended to identify key or important features of the embodiments of the present disclosure, and is not used to limit the scope of the present disclosure. Other features of the present disclosure will be easily understood through the following description.

BRIEF DESCRIPTION OF THE DRAWINGS

The accompanying drawings are used for a better understanding of the scheme, and do not constitute a limitation to the present disclosure. Here.

DETAILED DESCRIPTION OF EMBODIMENTS

Example embodiments of the present disclosure are described below in combination with the accompanying drawings, and various details of the embodiments of the present disclosure are included in the description to facilitate understanding, and should be considered as an example only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

In order to reduce the occurrence of traffic accidents, it is required to improve the accuracy of estimating the road surface adhesion coefficient, which helps to improve the operational safety of an autonomous driving vehicle.

An embodiment of the disclosure has the following advantages or beneficial effects. Multiple road surface adhesion coefficient estimation results are obtained based on different vehicle state parameters, some or all of the road surface adhesion coefficient estimation results are selected according to the traveling work condition of the vehicle on the target road section, and the road surface adhesion coefficient of the target road section is determined based on the selected road surface adhesion coefficient estimation results. As such, the vehicle can more accurately determine the road surface adhesion coefficient under different traveling work conditions.

Figure 1:
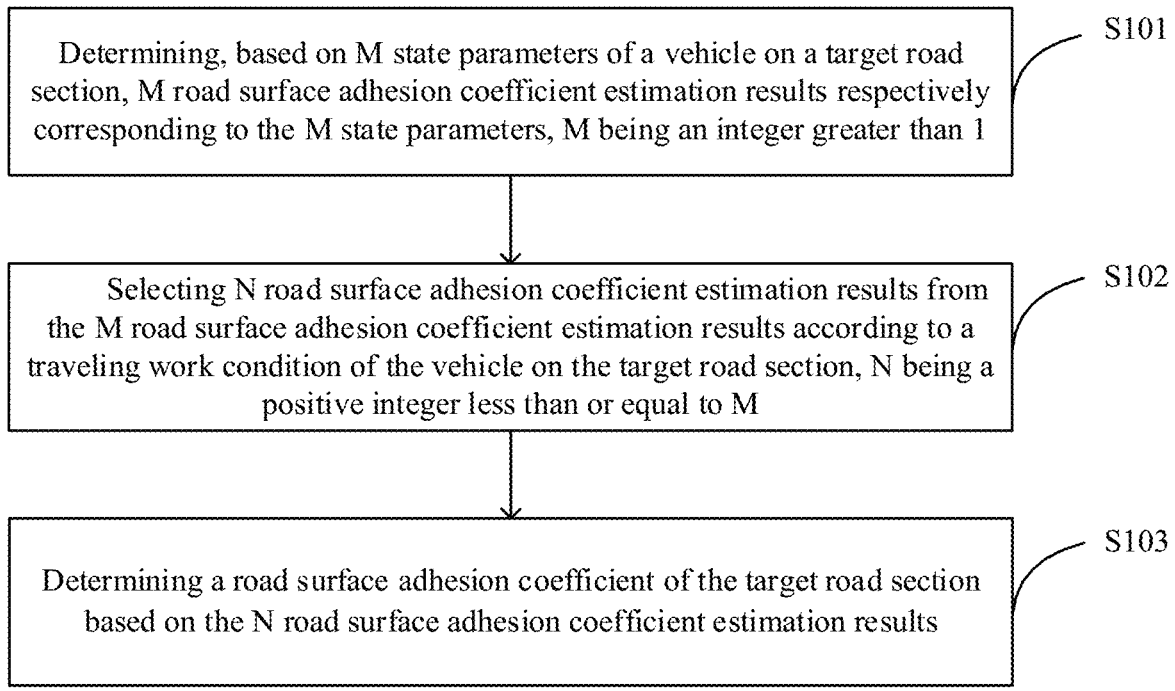
FIG. 1 is a flowchart of a method for determining a road surface adhesion coefficient according to an embodiment of the present disclosure.

FIG. 1 is a flowchart of a method for determining a road surface adhesion coefficient according to an embodiment of the present disclosure. As shown in FIG. 1, the method may include the following steps.

S101 includes determining, based on M state parameters of a vehicle on a target road section, M road surface adhesion coefficient estimation results respectively corresponding to the M state parameters, M being an integer greater than 1.

S102 includes selecting N road surface adhesion coefficient estimation results from the M road surface adhesion coefficient estimation results according to a traveling work condition of the vehicle on the target road section, N being a positive integer smaller than or equal to M.

S103 includes determining a road surface adhesion coefficient of the target road section based on the N road surface adhesion coefficient estimation results.

In step S101, as an example, the target road section may be a designated road section or any road section. When the vehicle travels on the target road section, a sensor on the vehicle may collect a state parameter of the vehicle. The state parameter may include at least one of: a vehicle speed, a wheel speed, a wheel acceleration, a wheel deflection angle, a yaw rate, a steering wheel angle, or a steering wheel torque. The vehicle may be an autonomous driving vehicle.

For example, one road surface adhesion coefficient estimation result may be determined according to one state parameter, or one road surface adhesion coefficient estimation result may be determined according to multiple state parameters.

In step S102, as an example, the traveling work condition refers to a working condition of the vehicle during traveling. The traveling work condition may include at least one of: a braking work condition, a driving work condition, a steering work condition, a vehicle reversing work condition, and a slipping work condition. The traveling work condition may correspond to multiple road surface adhesion coefficient estimation results, or may correspond to one road surface adhesion coefficient result. It should be noted that, in the situation where the traveling work condition is the vehicle reversing work condition or the slipping work condition, a road surface adhesion coefficient estimation result is not selected.

In step S103, as an example, in the situation where multiple road surface adhesion coefficient estimation results are determined, a calculation may be performed on the road surface adhesion coefficient estimation results according to a weight factor. Here, the weight factor is determined by the traveling work condition of the vehicle.

In the technical solution of the present disclosure, multiple road surface adhesion coefficient estimation results are obtained based on different vehicle state parameters, some or all of the road surface adhesion coefficient estimation results are selected from the M road surface adhesion coefficient estimation results according to the traveling work condition of the vehicle on the target road section, and the road surface adhesion coefficient of the target road section is determined based on the selected road surface adhesion coefficient estimation results. As such, the vehicle can more accurately determine the road surface adhesion coefficient under different traveling work conditions.

In an implementation, here, the M state parameters include at least one of: a vehicle state parameter corresponding to a wheel longitudinal force, a vehicle state parameter corresponding to a wheel lateral force, or a vehicle state parameter corresponding to a traction coefficient.

For example, in the situation where the M state parameters are vehicle state parameters corresponding to the wheel longitudinal force, a road surface adhesion coefficient estimation result corresponding to the wheel longitudinal force is determined.

In the situation where the M state parameters are vehicle state parameters corresponding to the wheel lateral force, a road surface adhesion coefficient estimation result corresponding to the wheel lateral force is determined.

In the situation where the M state parameters are vehicle state parameters corresponding to the traction coefficient, a road surface adhesion coefficient estimation result corresponding to the traction coefficient is determined.

In this embodiment, the corresponding road surface adhesion coefficient estimation result is determined according to the vehicle state parameter included in the M state parameters, and thus, the road surface adhesion coefficient may be determined from multiple perspectives. For example, if the M state parameters include the vehicle state parameter corresponding to the wheel longitudinal force and the vehicle state parameter corresponding to the wheel lateral force, the road surface adhesion coefficient estimation result corresponding to the wheel longitudinal force and the road surface adhesion coefficient estimation result corresponding to the wheel lateral force are determined.

Further, the selecting N road surface adhesion coefficient estimation results from the M road surface adhesion coefficient estimation results according to a traveling work condition of the vehicle on the target road section includes:

selecting, in a situation where the traveling work condition refers to the braking work condition, a road surface adhesion coefficient estimation result corresponding to the wheel longitudinal force;

selecting, in a situation where the traveling work condition refers to the steering work condition, a road surface adhesion coefficient estimation result corresponding to the wheel lateral force;

selecting, in a situation where the traveling work condition refers to the driving work condition, the road surface adhesion coefficient estimation result corresponding to the wheel longitudinal force and a road surface adhesion coefficient estimation result corresponding to the traction coefficient;

selecting, in a situation where the traveling work condition refers to the steering work condition and the braking work condition, the road surface adhesion coefficient estimation result corresponding to the wheel longitudinal force and the road surface adhesion coefficient estimation result corresponding to the wheel lateral force; and selecting, in a situation where the traveling work condition refers to the steering work condition and the driving work condition, the road surface adhesion coefficient estimation result corresponding to the wheel longitudinal force, the road surface adhesion coefficient estimation result corresponding to the wheel lateral force and the road surface adhesion coefficient estimation result corresponding to the traction coefficient.

In a situation where the traveling work condition refers to the vehicle reversing work condition and/or the slipping work condition, no selection is performed on the above estimation results or the weight factor of the selected estimation result is adjusted to 0.

Figure 2:
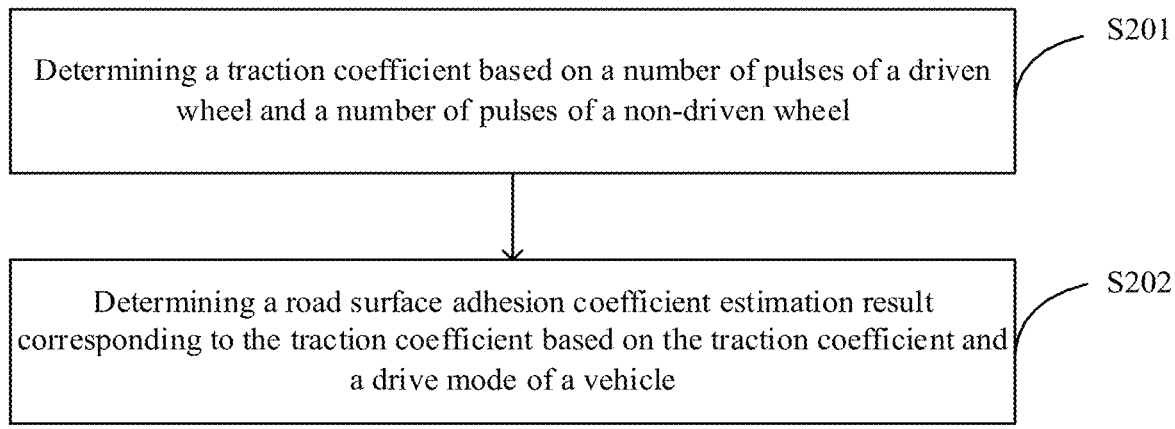
FIG. 2 is a flowchart of a method for determining a road surface adhesion coefficient according to another embodiment of the present disclosure.
Figure 3:
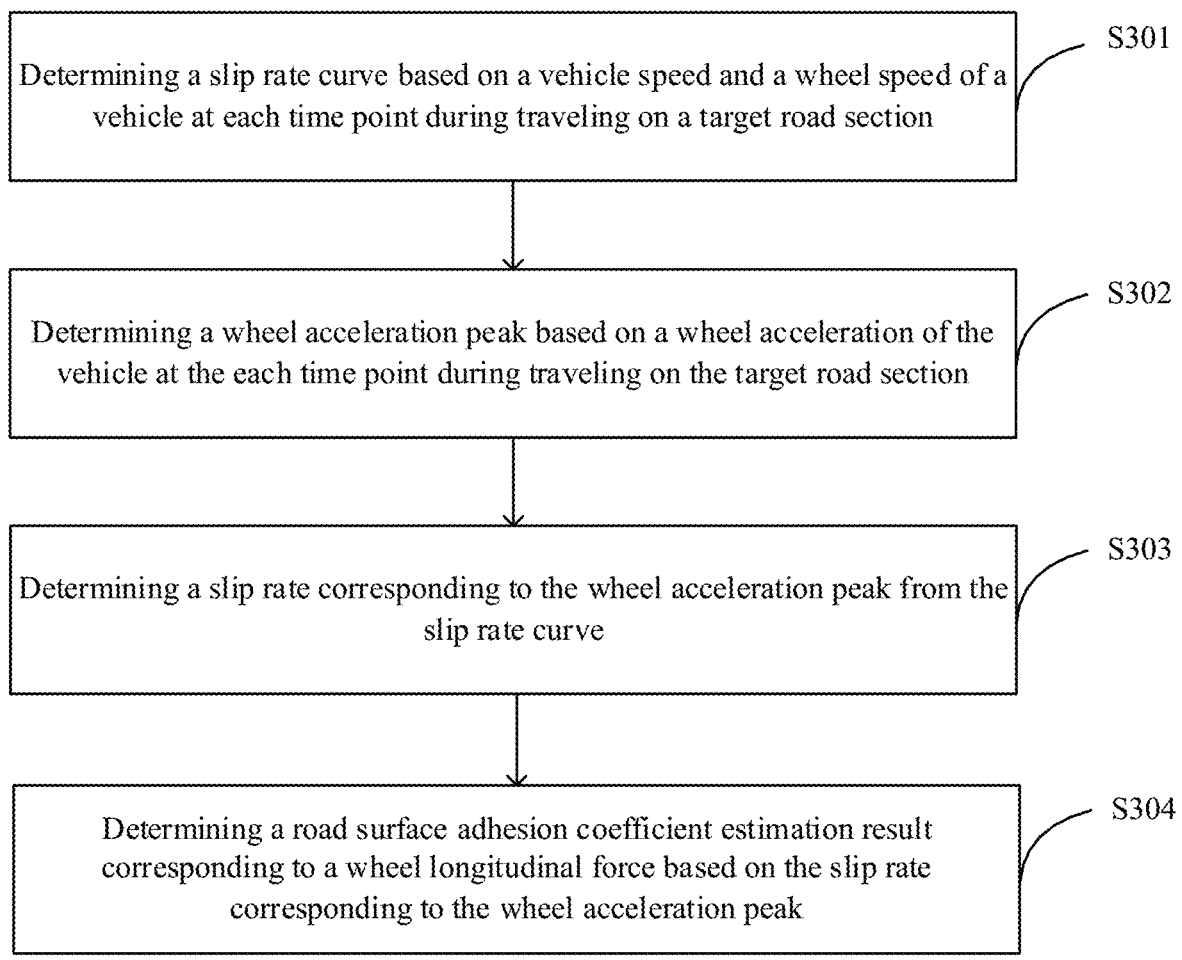
FIG. 3 is a flowchart of a method for determining a road surface adhesion coefficient according to another embodiment of the present disclosure.

In an implementation, as shown in FIG. 2, the vehicle state parameter corresponding to the traction coefficient includes a number of pulses of a driven wheel and a number of pulses of a non-driven wheel.

The determining, based on M state parameters of a vehicle on a target road section, M road surface adhesion coefficient estimation results respectively corresponding to the M state parameters includes following steps.

S201 includes determining the traction coefficient based on the number of the pulses of the driven wheel and the number of the pulses of the non-driven wheel.

S202 includes determining a road surface adhesion coefficient estimation result corresponding to the traction coefficient based on the traction coefficient and a drive mode of the vehicle.

Here, the drive mode of the vehicle includes: front-wheel drive, rear-wheel drive, and four-wheel drive. For each drive mode, an interpolation table is correspondingly provided. Here, the interpolation table is a table of corresponding relationships between traction coefficients and the road surface adhesion coefficient estimation results, which is determined by testing under multiple typical road surface adhesions of vehicles of different driving modes with a speed of 0-100 km/h, and by calculating traction coefficients under different conditions at the same time.

In this embodiment, $$TI = \frac{NWP_{ND}}{NWP_D}.$$

Here, $NWP_{ND}$ is a number of pulses of a non-driven wheel in a specific time interval or a selected distance, $NWP_D$ is a number of pulses of a driven wheel in the specific time interval or the selected distance, and TI is a traction coefficient.

After the drive mode of the vehicle is determined, a corresponding interpolation table is determined according to the drive mode of the vehicle, and the interpolation table is searched for a corresponding road surface adhesion coefficient estimation result according to the traction coefficient. It can be seen that the traction coefficient may alternatively be determined through the numbers of the pulses of the wheels, without a need to limit the length of the time and the length of the distance. Thus, the road surface adhesion coefficient estimation result may alternatively be accurately determined according to the traction coefficient, without a need to measure a precise distance.

In an implementation, here, the vehicle state parameter corresponding to the wheel longitudinal force includes a vehicle speed, a wheel speed and a wheel acceleration.

The determining, based on M state parameters of a vehicle on a target road section, M road surface adhesion coefficient estimation results respectively corresponding to the M state parameters includes following steps.

S301 includes determining a slip rate curve based on a vehicle speed and a wheel speed of the vehicle at each time point during traveling on the target road section.

S302 includes determining a wheel acceleration peak based on a wheel acceleration of the vehicle at each time point during traveling on the target road section.

S303 includes determining a slip rate corresponding to the wheel acceleration peak from the slip rate curve.

S304 includes determining a road surface adhesion coefficient estimation result corresponding to the wheel longitudinal force based on the slip rate corresponding to the wheel acceleration peak.

As an example, the vehicle speed, the wheel speed, the wheel acceleration and a wheel rolling angular speed may be collected by various sensors on the vehicle, and a slip rate may be calculated according to the vehicle speed, the wheel speed, the wheel rolling angular speed and a wheel radius. The formula is as follows:

$$s = (v - v_w)\frac{(v - v_w)}{v} * 100\%, v_w = \omega * r.$$

Here, s is a slip rate, $v_w$ is a wheel speed, v is a vehicle speed, $\omega$ is a wheel rolling angular speed, and r is a wheel radius.

Figure 4:
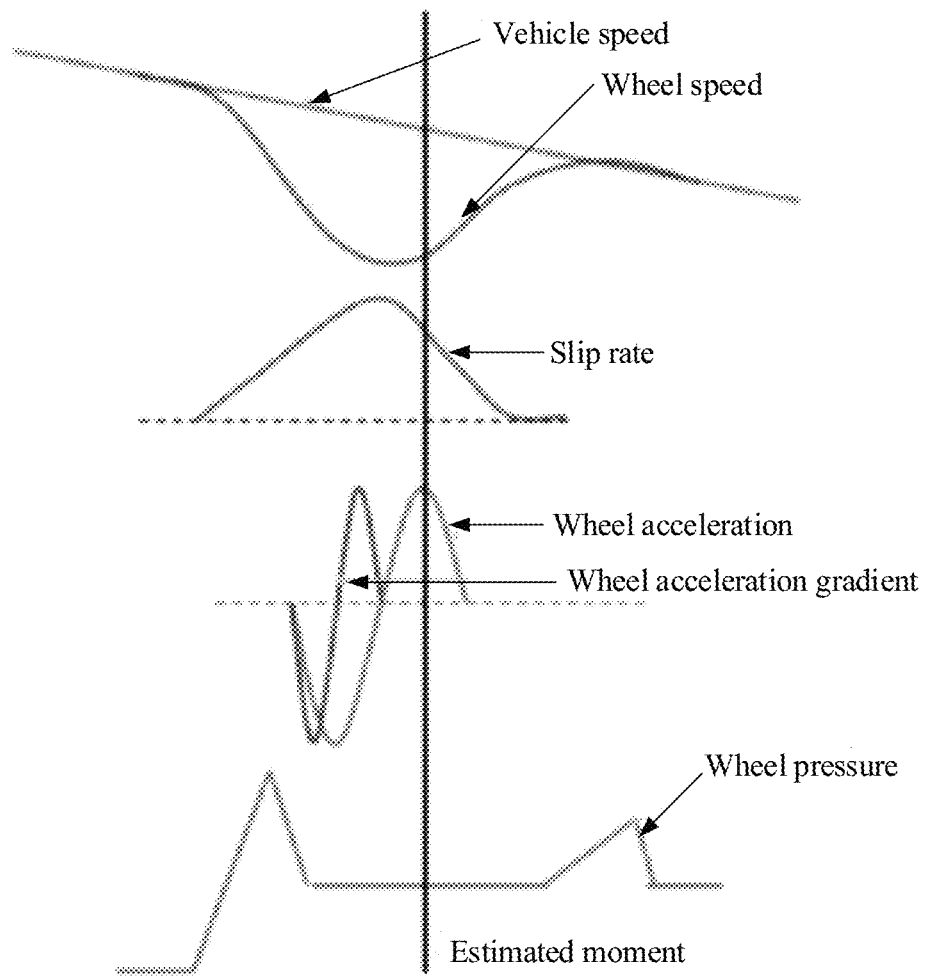
FIG. 4 is a schematic diagram of a vehicle speed curve, a wheel speed curve, a wheel acceleration curve, a wheel pressure curve and a slip rate curve according to an embodiment of the present disclosure.

In this embodiment, as shown in FIG. 4, in the situation where the traveling work condition is in a non-linear region, the slip rate curve is obtained after the slip rates at time points are calculated, and a vehicle speed curve, a wheel speed curve, a wheel acceleration curve and a wheel pressure curve are respectively obtained according to the vehicle speeds, the wheel speeds, the wheel accelerations and the wheel pressures at the time points.

In the situation where it is ensured that an anti-lock braking system and a traction control system start to work (i.e., the slip rate reaches a peak), and meanwhile it is ensured that there is at least one process of controlling the wheel to increase, release or keep the pressure, the determined road surface adhesion coefficient estimation result is accurate. Therefore, the time point corresponding to the wheel acceleration peak is determined based on the vehicle speed curve, the wheel speed curve, the wheel acceleration curve, the wheel pressure curve, and the condition. The wheel longitudinal force is calculated based on the slip rate corresponding to the time point at which the wheel acceleration is at peak. For example, the slip rate is calculated using a magic formula, thus obtaining the wheel longitudinal force. Since the calculation result of the wheel longitudinal force is accurate, the accuracy of the estimation result of the road surface adhesion coefficient corresponding to the wheel longitudinal force that is determined based on the wheel longitudinal force is higher.

For example, the calculation formula of the estimation result of the road surface adhesion coefficient corresponding to the wheel longitudinal force is as follows:

$$\mu_1 = \frac{F_x}{F_z}.$$

In the formula, $\mu_1$ is an estimated value of a road surface adhesion coefficient corresponding to a wheel longitudinal force, $F_x$ is the wheel longitudinal force, and $F_z$ is a wheel vertical load.

Further, in a situation where the traveling work condition is in a linear region, the slip rate and the wheel longitudinal force are calculated through a least squares method, to obtain a slope gradient number. Then, the road surface adhesion coefficient estimation result under the traveling work condition may be obtained by performing a linear interpolation calculation on the slope gradient number. Accordingly, it can be seen that determining whether the traveling work condition is in the linear region covers various work conditions of the vehicle when operating, such that the calculated road surface adhesion coefficient estimation result is with more pertinence.

The calculation formula of the least squares method is as follows:

$$Y_i = \beta_0 + \beta_1 x_i,$$

$$\beta_0 = \frac{\Sigma x_i^2 \Sigma y_i - \Sigma x_i \Sigma x_i y_i}{n \Sigma x_i^2 - (\Sigma x_i)^2},$$

$$\beta_1 = \frac{n \Sigma x_i y_i - \Sigma x_i \Sigma y_i}{n \Sigma x_i^2 - (\Sigma x_i)^2}.$$

Here, $x_i$ is an i-th sampling value of the slip rate, $y_i$ is an i-th sampling value of the wheel longitudinal force, $\beta_0$ is an estimated coefficient of a sample regression model, $\beta_1$ is an estimated coefficient of the sample regression model, and $Y_i$ is a road surface adhesion coefficient estimation result.

In an implementation, the vehicle state parameter corresponding to the wheel lateral force includes a wheel sideslip angle and the wheel lateral force.

The determining, based on M state parameters of a vehicle on a target road section, M road surface adhesion coefficient estimation results respectively corresponding to the M state parameters includes:

determining, in the situation where the traveling work condition of the vehicle is in the linear region, a road surface adhesion coefficient estimation result corresponding to the wheel lateral force based on a wheel sideslip angle and a wheel lateral force of the vehicle on the target road section and the least squares method.

For example, the wheel lateral force corresponds to the steering work condition. That is, in the situation where the traveling work condition includes the steering work condition, the road surface adhesion coefficient estimation result corresponding to the wheel lateral force is calculated.

For example, in the situation where the traveling work condition of the vehicle is in the linear region, the wheel sideslip angle and the wheel lateral force are calculated through the least squares method, to obtain a slope gradient number. Then, the road surface adhesion coefficient estimation result under the traveling work condition may be obtained by performing a linear interpolation calculation on the slope gradient number. Accordingly, it can be seen that determining whether the traveling work condition is in the linear region covers various work conditions of the vehicle when operating, such that the calculated road surface adhesion coefficient estimation result is with more pertinence.

The calculation formula of the least squares method is as follows:

$$Y_i = \beta_0 + \beta_1 x_i,$$

$$\beta_0 = \frac{\Sigma x_i^2 \Sigma y_i - \Sigma x_i \Sigma x_i y_i}{n \Sigma x_i^2 - (\Sigma x_i)^2},$$

$$\beta_1 = \frac{n \Sigma x_i y_i - \Sigma x_i \Sigma y_i}{n \Sigma x_i^2 - (\Sigma x_i)^2}.$$

Here, $x_i$ is an i-th sampling value of a tire sideslip angle, $y_i$ is an i-th sampling value of a tire lateral force, $\beta_0$ is an estimated coefficient of a sample regression model, $\beta_1$ is an estimated coefficient of the sample regression model, and $Y_i$ is a road surface adhesion coefficient estimation result.

In an implementation, here, the determining, based on M state parameters of a vehicle on a target road section, M road surface adhesion coefficient estimation results respectively corresponding to the M state parameters further includes:

determining, in the situation where the traveling work condition of the vehicle is in the non-linear region, a road surface adhesion coefficient estimation result corresponding to the wheel lateral force based on the wheel sideslip angle and the wheel lateral force of the vehicle on the target road section and a lateral tire kinetic model.

Figure 5:
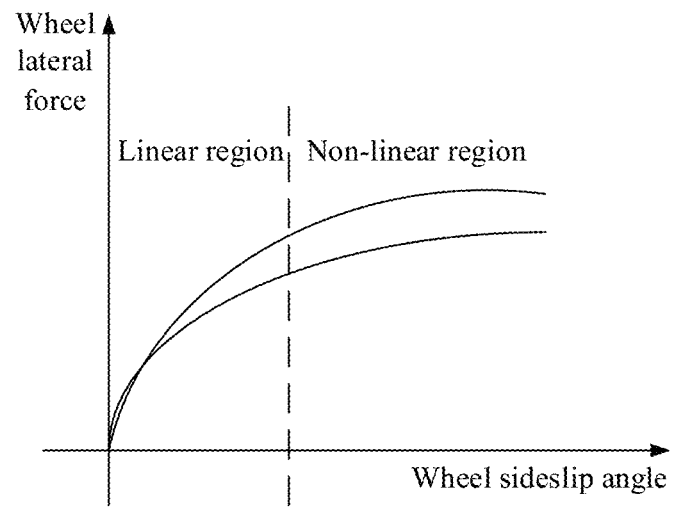
FIG. 5 is a schematic diagram of a kinetic curve according to an embodiment of the present disclosure.

In this embodiment, as shown in FIG. 5, the lateral tire kinetic model is a kinetic curve, from which a sideslip angle (i.e., a corresponding sideslip angle after the wheel lateral force reaches peak) at which the tire lateral force enters a saturation region may be selected in the non-linear region. A tire self-aligning torque and a pneumatic trail are acquired, and the wheel lateral force is calculated according to the tire self-aligning torque and the pneumatic trail. The road surface adhesion coefficient estimation result corresponding to the wheel lateral force is calculated according to the wheel lateral force and the wheel sideslip angle, the specific formula being as follows:

$$\mu_2 = \frac{\frac{M_z}{e}}{\alpha}.$$

Here, $M_z$ is a tire self-aligning torque, $e$ is a pneumatic trail, and $\alpha$ is a wheel sideslip angle.

It can be seen that the road surface adhesion coefficient estimation result can still be accurately calculated in the situation where the traveling work condition is in the non-linear region.

In an implementation, the method further includes:
determining a safety margin of the vehicle based on the road surface adhesion coefficient of the target road section and an adhesion coefficient used by the vehicle.

For example, the safety margin=the road surface adhesion coefficient−the adhesion coefficient used by the vehicle. After the road surface adhesion coefficient of the target road section is determined, the vehicle may determine the condition of a target road surface according to the road surface adhesion coefficient of the target road section. The safety margin of the vehicle is determined in combination with the adhesion coefficient used by the vehicle, which helps a driver fully understand whether the vehicle is safe at present, thereby ensuring the driving safety of the driver. If the current vehicle is an autonomous driving vehicle, each driving parameter of the vehicle can be directly controlled according to the safety margin, such that the vehicle can be driven more safely.

In an implementation, the method further includes:
controlling the vehicle to travel based on the safety margin.

For example, after the safety margin is calculated according to the road surface adhesion coefficient and the adhesion coefficient used by the vehicle, the traveling parameters (e.g., a speed and an acceleration) of the autonomous driving vehicle may be adjusted according to the safety margin. Therefore, the operational safety of the autonomous driving vehicle can be ensured. For example, the road surface condition corresponding to the safety margin may be determined by setting one or more thresholds. When the safety margin is high, it indicates that the road surface condition of the current road section is good. Therefore, the current driving strategy may be maintained, or the traveling parameters of the autonomous driving vehicle may be adaptively improved. When the safety margin is low, it indicates that the road surface condition of the current road section is poor. Therefore, a conservative driving strategy, for example, lowering the traveling parameters of the autonomous driving vehicle, may be used.

An example is given as follows.

Figure 6:
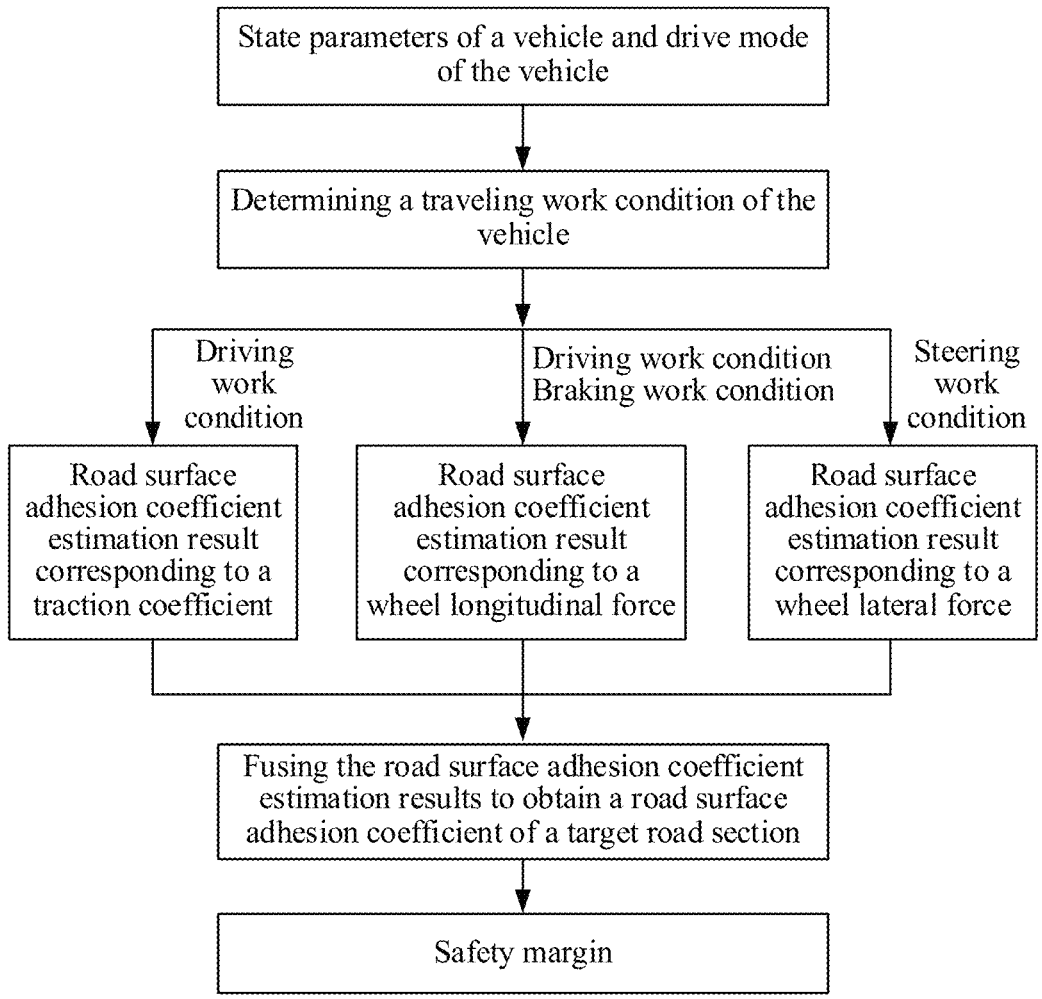
FIG. 6 is a specific schematic flow diagram of a method for determining a road surface adhesion coefficient according to an embodiment of the present disclosure.

As shown in FIG. 6, the drive mode of the vehicle is determined, and the state parameters of the vehicle are inputted, to determine the traveling work condition of the vehicle. Moreover, it is required to distinguish whether the traveling work condition is in the linear region or the non-linear region. At least one road surface adhesion coefficient estimation result is selected according to the traveling work condition, and the road surface adhesion coefficients of the target road section are calculated by allocating weight factors to road surface adhesion coefficient estimation results, so as to ensure that the road surface adhesion coefficients do not have a burr jump to influence a subsequent application. Here, the weight factor takes into account the traveling work condition of the vehicle. The slip rate influences the road surface adhesion coefficient estimation result corresponding to the wheel longitudinal force, and the tire sideslip angle influences the road surface adhesion coefficient estimation result corresponding to the wheel lateral force. Therefore, the weight factor is adjusted according to the slip rate and the size of the tire sideslip angle, such that the calculated road surface adhesion coefficient is more accurate. Then, the safety margin is determined according to the road surface adhesion coefficient of the target road section and the adhesion coefficient used by the vehicle, and the safety margin may be displayed on the vehicle to help the driver understand the road surface condition.

Figure 7:
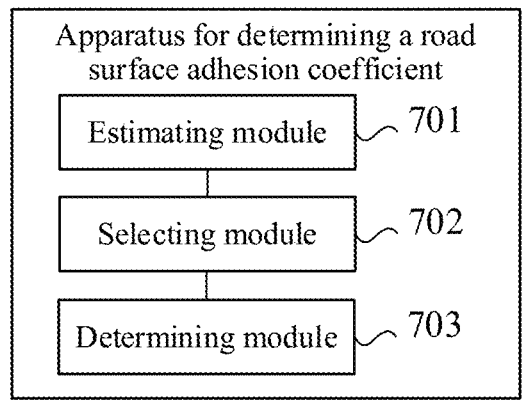
FIG. 7 is a block diagram of an apparatus for determining a road surface adhesion coefficient according to an embodiment of the present disclosure.

FIG. 7 is a block diagram of an apparatus for determining a road surface adhesion coefficient according to an embodiment of the present disclosure. As shown in FIG. 7, the apparatus may include:
- an estimating module 701, configured to determine, based on M state parameters of a vehicle on a target road section, M road surface adhesion coefficient estimation results respectively corresponding to the M state parameters, M being an integer greater than 1;
- a selecting module 702, configured to select N road surface adhesion coefficient estimation results from the M road surface adhesion coefficient estimation results according to a traveling work condition of the vehicle on the target road section, N being a positive integer smaller than or equal to M; and
- a determining module 703, configured to determine a road surface adhesion coefficient of the target road section based on the N road surface adhesion coefficient estimation results.

In an implementation, the M state parameters include at least one of: a vehicle state parameter corresponding to a wheel longitudinal force, a vehicle state parameter corresponding to a wheel lateral force, or a vehicle state parameter corresponding to a traction coefficient.

In an implementation, as shown in FIG. 7, the vehicle state parameter corresponding to the traction coefficient includes a number of pulses of a driven wheel and a number of pulses of a non-driven wheel.

The estimating module 701 is further configured to: determine the traction coefficient based on the number of the pulses of the driven wheel and the number of the pulses of the non-driven wheel; and
- determine a road surface adhesion coefficient estimation result corresponding to the traction coefficient based on the traction coefficient and a drive mode of the vehicle.

In an implementation, as shown in FIG. 7, the vehicle state parameter corresponding to the wheel longitudinal force includes a vehicle speed, a wheel speed and a wheel acceleration.

The estimating module 701 is further configured to:
- determine a slip rate curve based on a vehicle speed and a wheel speed of the vehicle at each time point during traveling on the target road section;
- determine a wheel acceleration peak based on a wheel acceleration of the vehicle at each time point during traveling on the target road section;
- determine a slip rate corresponding to the wheel acceleration peak from the slip rate curve; and
- determine a road surface adhesion coefficient estimation result corresponding to the wheel longitudinal force based on the slip rate corresponding to the wheel acceleration peak.

In an implementation, as shown in FIG. 7, the vehicle state parameter corresponding to the wheel lateral force includes a wheel sideslip angle and the wheel lateral force.

The estimating module 701 is further configured to:
- determine, in a situation where the traveling work condition of the vehicle is in a linear region, a road surface adhesion coefficient estimation result corresponding to the wheel lateral force based on a wheel sideslip angle and a wheel lateral force of the vehicle on the target road section and a least squares method.

In an implementation, as shown in FIG. 7, the estimating module 701 is further configured to: determine, in a situation where the traveling work condition of the vehicle is in a non-linear region, a road surface adhesion coefficient estimation result corresponding to the wheel lateral force based on the wheel sideslip angle and the wheel lateral force of the vehicle on the target road section and a lateral tire kinetic model.

Figure 8:
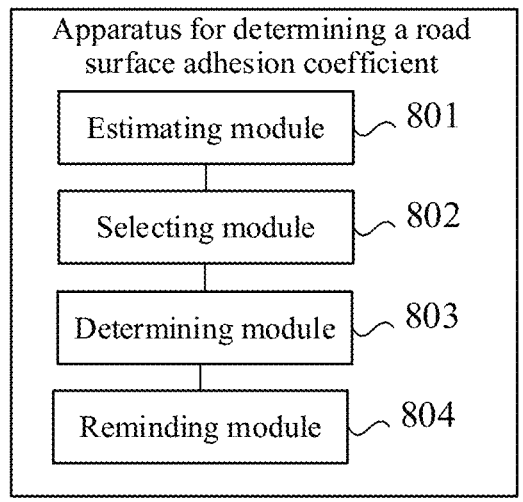
FIG. 8 is a block diagram of an apparatus for determining a road surface adhesion coefficient according to another embodiment of the present disclosure.

FIG. 8 is a block diagram of an apparatus for determining a road surface adhesion coefficient according to another embodiment of the present disclosure. As shown in FIG. 8, the apparatus may include:
- an estimating module 801, configured to determine, based on M state parameters of a vehicle on a target road section, M road surface adhesion coefficient estimation results respectively corresponding to the M state parameters;
- a selecting module 802, configured to select N road surface adhesion coefficient estimation results from the M road surface adhesion coefficient estimation results according to a traveling work condition of the vehicle on the target road section;
- a determining module 803, configured to determine a road surface adhesion coefficient of the target road section based on the N road surface adhesion coefficient estimation results; and
- a reminding module 804, configured to determine a safety margin of the vehicle based on the road surface adhesion coefficient of the target road section and an adhesion coefficient used by the vehicle.

In this way, according to the apparatus in the embodiment of the present disclosure, multiple road surface adhesion coefficient estimation results are obtained based on different vehicle state parameters, some or all of the road surface adhesion coefficient estimation results are selected from the M road surface adhesion coefficient estimation results according to the traveling work condition of the vehicle on the target road section, and the road surface adhesion coefficient of the target road section is determined based on the selected road surface adhesion coefficient estimation results. As such, the vehicle can more accurately determine the road surface adhesion coefficient under different traveling work conditions.

In the technical solution of the present disclosure, the acquisition, storage, application, etc. of the personal information of a user all comply with the provisions of the relevant laws and regulations, and do not violate public order and good customs.

According to an embodiment of the present disclosure, the present disclosure further provides an electronic device, a readable storage medium, and a computer program product. Alternatively, the electronic device may be applied to an autonomous driving vehicle. That is, the present disclosure further provides an autonomous driving vehicle, including the electronic device. The autonomous driving vehicle can more accurately determine the road surface adhesion coefficient, thereby ensuring the operational safety of the autonomous driving vehicle.

Figure 9:
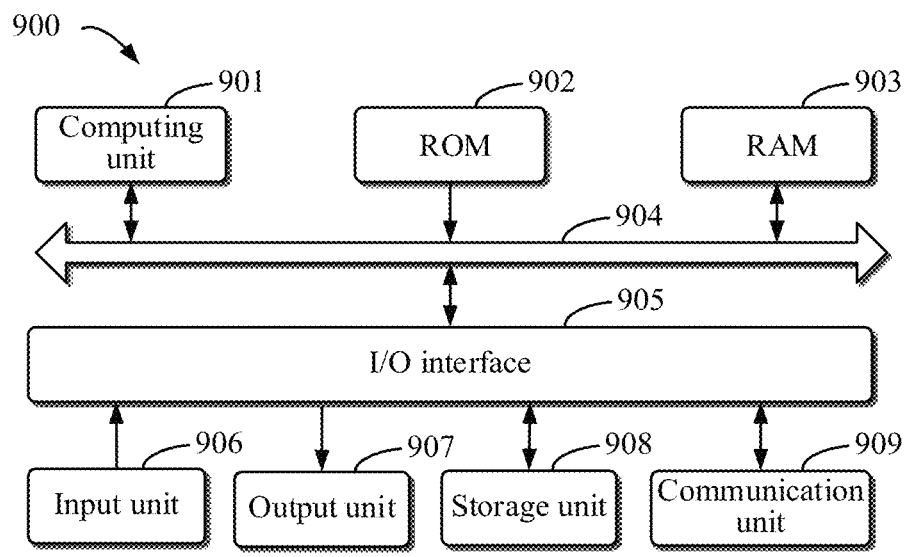
FIG. 9 is a block diagram of an electronic device adapted to implement the method for determining a road surface adhesion coefficient according to the embodiments of the present disclosure.

FIG. 9 is a schematic block diagram of an example electronic device 900 that may be adapted to implement the embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may alternatively represent various forms of mobile apparatuses such as personal digital assistant a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 9, the device 900 includes a computing unit 901, which can perform various appropriate actions and processes according to a computer program stored in a read only memory (ROM) 902 or a computer program loaded from the storage unit 908 into a random access memory (RAM) 903. In RAM 903, various programs and data required for the operation of device 900 can also be stored. The computing unit 901, Rom 902, and ram 903 are connected to each other through a bus 904. Input/output (I/O) interface 905 is also connected to bus 904.

A plurality of components in the device 900 are connected to the I/O interface 905, including: an input unit 906, such as a keyboard, a mouse, etc.; an output unit 907, such as various types of displays, speakers, and the like; a storage unit 908, such as a magnetic disk, an optical disk, and the like; and a communication unit 909, such as a network card, a modem, a wireless communication transceiver, and the like. The communication unit 909 allows the device 900 to exchange information/data with other devices through computer networks such as the Internet and/or various telecommunication networks.

The computing unit 901 may be various general-purpose and/or special-purpose processing components with processing and computing capabilities. Some examples of the computing unit 901 include, but are not limited to, a central processing unit (CPU), a graphics processing unit (GPU), various dedicated artificial intelligence (AI) computing chips, various computing units that run machine learning model algorithms, digital signal processors (DSPS), and any appropriate processors, controllers, microcontrollers, and the like. The computing unit 901 performs the various methods and processes described above, such as a method for determining a road surface adhesion coefficient. For example, in some embodiments, the method for determining a road surface adhesion coefficient may be implemented as a computer software program that is tangibly contained in a machine-readable medium, such as a storage unit 908. In some embodiments, part or all of the computer program may be loaded and/or installed on the device 900 via ROM 902 and/or communication unit 909. When the computer program is loaded into RAM 903 and executed by the computing unit 901, one or more steps of the method for determining a road surface adhesion coefficient described above may be performed. Alternatively, in other embodiments, the computing unit 901 may be configured to perform the method for determining a road surface adhesion coefficient by any other suitable means (e.g., by means of firmware).

Various embodiments of the systems and technologies described above in this paper can be implemented in digital electronic circuit systems, integrated circuit systems, field programmable gate arrays (FPGAs), application specific integrated circuits (ASIC), application specific standard products (ASSP), system on chip (SOC), load programmable logic devices (CPLD), computer hardware, firmware, software, and/or combinations thereof. These various embodiments may include: being implemented in one or more computer programs, the one or more computer programs can be executed and/or interpreted on a programmable system including at least one programmable processor, which can be a special-purpose or general-purpose programmable processor, and can receive data and instructions from the storage system, at least one input device, and at least one output device, and transmitting data and instructions to the storage system, the at least one input device, and the at least one output device.

The program code for implementing the methods of the present disclosure may be written in any combination of one or more programming languages. These program codes can be provided to the processor or controller of general-purpose computer, special-purpose computer or other programmable data processing device, so that when the program code is executed by the processor or controller, the functions/operations specified in the flow chart and/or block diagram are implemented. The program code can be completely executed on the machine, partially executed on the machine, partially executed on the machine and partially executed on the remote machine as a separate software package, or completely executed on the remote machine or server.

In the context of the present disclosure, a machine-readable medium may be a tangible medium that may contain or store a program for use by or in combination with an instruction execution system, apparatus, or device. The machine-readable medium can be a machine-readable signal medium or a machine-readable storage medium. Machine readable media may include, but are not limited to, electronic, magnetic, optical, electromagnetic, infrared, or semiconductor systems, apparatuses, or devices, or any suitable combination of the foregoing. More specific examples of machine-readable storage media may include one or more wire based electrical connections, portable computer disks, hard disks, random access memory (RAM), read only memory (ROM), erasable programmable read only memory (EPROM or flash memory), optical fibers, compact disk read only memory (CD-ROM), optical storage devices, magnetic storage devices, or any suitable combination of the above.

In order to provide interaction with users, the systems and techniques described herein can be implemented on a computer with: a display device for displaying information to users (for example, a CRT (cathode ray tube) or LCD (liquid crystal display) monitor); and a keyboard and a pointing device (e.g., a mouse or a trackball) through which the user can provide input to the computer. Other kinds of devices can also be used to provide interaction with users. For example, the feedback provided to the user may be any form of sensor feedback (e.g., visual feedback, auditory feedback, or tactile feedback); and the input from the user can be received in any form (including acoustic input, voice input or tactile input).

The systems and techniques described herein may be implemented in a computing system including background components (e.g., as a data server), or a computing system including middleware components (e.g., an application server) or a computing system including a front-end component (e.g., a user computer with a graphical user interface or a web browser through which a user can interact with embodiments of the systems and techniques described herein), or a computing system including any combination of the back-end component, the middleware component, the front-end component. The components of the system can be interconnected by digital data communication (e.g., communication network) in any form or medium. Examples of communication networks include local area networks (LANs), wide area networks (WANs), and the Internet.

A computer system may include a client and a server. The client and the server are generally far away from each other and usually interact through communication networks. The relationship between the client and the server is generated by computer programs running on the corresponding computers and having a client server relationship with each other. The server can be a cloud server, a distributed system server, or a blockchain server.

It should be understood that various forms of processes shown above can be used to reorder, add or delete steps. For example, the steps recorded in the present disclosure can be performed in parallel, in sequence, or in different orders, as long as the desired results of the technical solution of the present disclosure can be achieved, which is not limited herein.

The above specific embodiments do not constitute restrictions on the scope of the present disclosure. Those skilled in the art should understand that various modifications, combinations, sub combinations and substitutions can be made according to design requirements and other factors. Any modification, equivalent replacement and improvement made within the spirit and principles of this disclosure shall be included in the scope of protection of this disclosure.

What is claimed is:

1. A method for determining a road surface adhesion coefficient, comprising:
    determining, based on M state parameters of a vehicle on a target road section, M road surface adhesion coefficient estimation results respectively corresponding to the M state parameters, M being an integer greater than 1;
    selecting N road surface adhesion coefficient estimation results from the M road surface adhesion coefficient estimation results according to a traveling work condition of the vehicle on the target road section, N being a positive integer smaller than or equal to M; and
    determining the road surface adhesion coefficient of the target road section based on the N road surface adhesion coefficient estimation results;
    wherein the M state parameters comprise at least one of: a vehicle state parameter corresponding to a wheel longitudinal force, a vehicle state parameter corresponding to a wheel lateral force, or a vehicle state parameter corresponding to a traction coefficient,
    wherein the vehicle state parameter corresponding to the traction coefficient comprises a number of pulses of a driven wheel and a number of pulses of a non-driven wheel,
    wherein the determining, based on the M state parameters of the vehicle on the target road section, the M road surface adhesion coefficient estimation results respectively corresponding to the M state parameters comprises:
        determining the traction coefficient based on the number of pulses of the driven wheel and the number of pulses of the non-driven wheel; and
        determining a road surface adhesion coefficient estimation result corresponding to the traction coefficient based on the traction coefficient and a drive mode of the vehicle;
    wherein the vehicle state parameter corresponding to the wheel longitudinal force comprises a vehicle speed, a wheel speed and a wheel acceleration,
    wherein the determining, based on the M state parameters of the vehicle on the target road section, the M road surface adhesion coefficient estimation results respectively corresponding to the M state parameters comprises:
        determining a slip rate curve based on the vehicle speed and the wheel speed of the vehicle at each time point during traveling on the target road section;
        determining a wheel acceleration peak based on the wheel acceleration of the vehicle at the each time point during traveling on the target road section;
        determining a slip rate corresponding to the wheel acceleration peak from the slip rate curve; and
        determining a road surface adhesion coefficient estimation result corresponding to the wheel longitudinal force based on the slip rate corresponding to the wheel acceleration peak,
    wherein the vehicle state parameter corresponding to the wheel lateral force comprises a wheel sideslip angle and the wheel lateral force, and
    wherein the determining, based on the M state parameters of the vehicle on the target road section, the M road surface adhesion coefficient estimation results respectively corresponding to the M state parameters comprises:
        determining, in a situation where the traveling work condition of the vehicle is in a linear region, a road surface adhesion coefficient estimation result corresponding to the wheel lateral force based on the wheel sideslip angle and the wheel lateral force of the vehicle on the target road section and a least squares method.

2. The method according to claim 1, wherein the determining, based on the M state parameters of the vehicle on the target road section, the M road surface adhesion coefficient estimation results respectively corresponding to the M state parameters further comprises:
    determining, in a situation where the traveling work condition of the vehicle is in a non-linear region, a road surface adhesion coefficient estimation result corresponding to the wheel lateral force based on the wheel sideslip angle and the wheel lateral force of the vehicle on the target road section and a lateral tire kinetic model.

3. The method according to claim 1, further comprising:
determining a safety margin of the vehicle based on the road surface adhesion coefficient of the target road section and an adhesion coefficient used by the vehicle.

4. The method according to claim 3, further comprising:
controlling the vehicle to travel based on the safety margin.

5. An apparatus for determining a road surface adhesion coefficient, comprising:
at least one processor; and
a storage device,
wherein the storage device stores instructions executable by the at least one processor, and the instructions, when executed by the at least one processor, cause the at least one processor to perform operations comprising:
determining, based on M state parameters of a vehicle on a target road section, M road surface adhesion coefficient estimation results respectively corresponding to the M state parameters, M being an integer greater than 1;
selecting N road surface adhesion coefficient estimation results from the M road surface adhesion coefficient estimation results according to a traveling work condition of the vehicle on the target road section, N being a positive integer smaller than or equal to M; and
determining the road surface adhesion coefficient of the target road section based on the N road surface adhesion coefficient estimation results,
wherein the M state parameters comprise at least one of: a vehicle state parameter corresponding to a wheel longitudinal force, a vehicle state parameter corresponding to a wheel lateral force, or a vehicle state parameter corresponding to a traction coefficient,
wherein the vehicle state parameter corresponding to the traction coefficient comprises a number of pulses of a driven wheel and a number of pulses of a non-driven wheel,
wherein the determining, based on the M state parameters of the vehicle on the target road section, the M road surface adhesion coefficient estimation results respectively corresponding to the M state parameters comprises:
determining the traction coefficient based on the number of pulses of the driven wheel and the number of pulses of the non-driven wheel; and
determining a road surface adhesion coefficient estimation result corresponding to the traction coefficient based on the traction coefficient and a drive mode of the vehicle,
wherein the vehicle state parameter corresponding to the wheel longitudinal force comprises a vehicle speed, a wheel speed and a wheel acceleration,
wherein the determining, based on the M state parameters of the vehicle on the target road section, the M road surface adhesion coefficient estimation results respectively corresponding to the M state parameters comprises:
determining a slip rate curve based on the vehicle speed and the wheel speed of the vehicle at each time point during traveling on the target road section;
determining a wheel acceleration peak based on the wheel acceleration of the vehicle at the each time point during traveling on the target road section;
determining a slip rate corresponding to the wheel acceleration peak from the slip rate curve; and
determining a road surface adhesion coefficient estimation result corresponding to the wheel longitudinal force based on the slip rate corresponding to the wheel acceleration peak;
wherein the vehicle state parameter corresponding to the wheel lateral force comprises a wheel sideslip angle and the wheel lateral force, and
wherein the determining, based on the M state parameters of the vehicle on the target road section, the M road surface adhesion coefficient estimation results respectively corresponding to the M state parameters comprises:
determining, in a situation where the traveling work condition of the vehicle is in a linear region, a road surface adhesion coefficient estimation result corresponding to the wheel lateral force based on the wheel sideslip angle and the wheel lateral force of the vehicle on the target road section and a least squares method.

6. The apparatus according to claim 5, wherein the determining, based on the M state parameters of the vehicle on the target road section, the M road surface adhesion coefficient estimation results respectively corresponding to the M state parameters further comprises:
determining, in a situation where the traveling work condition of the vehicle is in a non-linear region, a road surface adhesion coefficient estimation result corresponding to the wheel lateral force based on the wheel sideslip angle and the wheel lateral force of the vehicle on the target road section and a lateral tire kinetic model.

7. The apparatus according to claim 5, wherein the operations comprise:
determining a safety margin of the vehicle based on the road surface adhesion coefficient of the target road section and an adhesion coefficient used by the vehicle.

8. The apparatus according to claim 7, wherein the operations further comprise:
controlling the vehicle to travel based on the safety margin.

9. A non-transitory computer readable storage medium, storing a computer instruction, wherein the computer instruction when executed by a computer causes the computer to perform operations comprising:
determining, based on M state parameters of a vehicle on a target road section, M road surface adhesion coefficient estimation results respectively corresponding to the M state parameters, M being an integer greater than 1;
selecting N road surface adhesion coefficient estimation results from the M road surface adhesion coefficient estimation results according to a traveling work condition of the vehicle on the target road section, N being a positive integer smaller than or equal to M; and
determining a road surface adhesion coefficient of the target road section based on the N road surface adhesion coefficient estimation results,
wherein the M state parameters comprise at least one of: a vehicle state parameter corresponding to a wheel longitudinal force, a vehicle state parameter corresponding to a wheel lateral force, or a vehicle state parameter corresponding to a traction coefficient, wherein the vehicle state parameter corresponding to the traction coefficient comprises a number of pulses of a driven wheel and a number of pulses of a non-driven wheel, wherein the determining, based on the M state parameters of the vehicle on the target road section, the M road surface adhesion coefficient estimation results respectively corresponding to the M state parameters comprises:
- determining the traction coefficient based on the number of pulses of the driven wheel and the number of pulses of the non-driven wheel; and
- determining a road surface adhesion coefficient estimation result corresponding to the traction coefficient based on the traction coefficient and a drive mode of the vehicle;

wherein the vehicle state parameter corresponding to the wheel longitudinal force comprises a vehicle speed, a wheel speed and a wheel acceleration, wherein the determining, based on the M state parameters of the vehicle on the target road section, the M road surface adhesion coefficient estimation results respectively corresponding to the M state parameters comprises:
- determining a slip rate curve based on the vehicle speed and the wheel speed of the vehicle at each time point during traveling on the target road section;
- determining a wheel acceleration peak based on the wheel acceleration of the vehicle at the each time point during traveling on the target road section;
- determining a slip rate corresponding to the wheel acceleration peak from the slip rate curve; and
- determining a road surface adhesion coefficient estimation result corresponding to the wheel longitudinal force based on the slip rate corresponding to the wheel acceleration peak, wherein the vehicle state parameter corresponding to the wheel lateral force comprises a wheel sideslip angle and the wheel lateral force, wherein the determining, based on the M state parameters of the vehicle on the target road section, the M road surface adhesion coefficient estimation results respectively corresponding to the M state parameters comprises:
- determining, in a situation where the traveling work condition of the vehicle is in a linear region, a road surface adhesion coefficient estimation result corresponding to the wheel lateral force based on the wheel sideslip angle and the wheel lateral force of the vehicle on the target road section and a least squares method.

10. The apparatus according to claim 5, further comprising an autonomous driving vehicle.

11. The method according to claim 1, wherein the M state parameters comprise two or three of:
- the vehicle state parameter corresponding to a wheel longitudinal force;
- the vehicle state parameter corresponding to a wheel lateral force; and
- a vehicle state parameter corresponding to a traction coefficient.

12. The apparatus according to claim 5, wherein the M state parameters comprise two or three of:
- the vehicle state parameter corresponding to a wheel longitudinal force;
- the vehicle state parameter corresponding to a wheel lateral force; and
- a vehicle state parameter corresponding to a traction coefficient.

13. The non-transitory computer readable storage medium according to claim 9, wherein the M state parameters comprise two or three of:
- the vehicle state parameter corresponding to a wheel longitudinal force;
- the vehicle state parameter corresponding to a wheel lateral force; and
- a vehicle state parameter corresponding to a traction coefficient.

* * * * *